United States Patent
Nishibe et al.

(10) Patent No.: US 11,030,975 B2
(45) Date of Patent: Jun. 8, 2021

(54) INFORMATION PROCESSING APPARATUS AND INFORMATION PROCESSING METHOD

(71) Applicant: SONY CORPORATION, Tokyo (JP)

(72) Inventors: Mitsuru Nishibe, Chiba (JP); Yuji Kusano, Tokyo (JP); Hiroyuki Aga, Tokyo (JP); Koichi Kawasaki, Tokyo (JP); Atsushi Ishihara, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 72 days.

(21) Appl. No.: 16/312,754

(22) PCT Filed: Apr. 19, 2017

(86) PCT No.: PCT/JP2017/015766
§ 371 (c)(1),
(2) Date: Dec. 21, 2018

(87) PCT Pub. No.: WO2018/008232
PCT Pub. Date: Jan. 11, 2018

(65) Prior Publication Data
US 2020/0035205 A1  Jan. 30, 2020

(30) Foreign Application Priority Data

Jul. 4, 2016  (JP) .............................. JP2016-132389

(51) Int. Cl.
*G09G 5/377* (2006.01)
*G06T 7/73* (2017.01)
(Continued)

(52) U.S. Cl.
CPC ......... *G09G 5/377* (2013.01); *G02B 27/0172* (2013.01); *G02B 27/0179* (2013.01);
(Continued)

(58) Field of Classification Search
CPC ...... G09G 5/377; G09G 5/38; G09G 2340/12; G06T 7/74; G06T 2207/30204;
(Continued)

(56) References Cited

U.S. PATENT DOCUMENTS 5,583,795 A * 12/1996 Smyth .................. A61B 3/0025
359/630
2015/0009313 A1 * 1/2015 Noda .................. G06K 9/00604
348/78

(Continued)

FOREIGN PATENT DOCUMENTS

CN          106575439 A      4/2017
JP          2014-155635 A    8/2014

(Continued)

OTHER PUBLICATIONS

Takahashi, et al., "Extrinsic Camera Calibration of Display-Camera System using Cornea Reflection", The Institute of Electronics,Information and Communication Engineers, MVF2015-31, Oct. 2015, 61-66 pages.

(Continued)

*Primary Examiner* — Chante E Harrison
(74) *Attorney, Agent, or Firm* — Chip Law Group

(57) ABSTRACT

An information processing apparatus according to an embodiment of the present technology includes an acquisition unit; and a display control unit. The acquisition unit is capable of acquiring a first image obtained by capturing an image of a real space reflected on a user's eyeball, and a second image obtained by capturing an image related to the real space displayed on a predetermined display unit, the real space displayed on the predetermined display unit being reflected on the eyeball. The display control unit controls, on (Continued)

a basis of the acquired first image and the acquired second image, image display performed by the predetermined display unit.

15 Claims, 7 Drawing Sheets

(51) Int. Cl.
*G02B 27/01* (2006.01)
*G09G 5/38* (2006.01)

(52) U.S. Cl.
CPC .............. *G06T 7/74* (2017.01); *G09G 5/38* (2013.01); *G02B 2027/0138* (2013.01); *G02B 2027/0178* (2013.01); *G02B 2027/0187* (2013.01); *G06T 2207/30204* (2013.01); *G09G 2340/12* (2013.01)

(58) Field of Classification Search
CPC ....... G06T 19/00; G06T 19/006; G02B 27/02; G02B 27/014; G02B 27/017; G02B 27/0172; G02B 27/0179; G02B 2027/0138; G02B 2027/0178; G02B 2027/0187; G06K 9/00604; G06K 9/00617
See application file for complete search history.

(56) References Cited

U.S. PATENT DOCUMENTS

| | | | | |
|---|---|---|---|---|
| 2016/0147301 | A1* | 5/2016 | Iwasaki | G06F 1/163 345/157 |
| 2016/0166140 | A1 | 6/2016 | Lawrenson et al. | |
| 2016/0349509 | A1* | 12/2016 | Lanier | G06F 3/011 |
| 2017/0011555 | A1* | 1/2017 | Li | G06T 1/60 |
| 2017/0243406 | A1* | 8/2017 | Yamazaki | G06T 19/006 |
| 2017/0249745 | A1* | 8/2017 | Fiala | G06T 7/277 |
| 2017/0257618 | A1* | 9/2017 | Haseltine | G03B 17/565 |
| 2018/0067306 | A1* | 3/2018 | Wilson | H04N 13/344 |

FOREIGN PATENT DOCUMENTS

| | | |
|---|---|---|
| KR | 10-2017-0020839 A | 2/2017 |
| WO | 2013/179427 A1 | 12/2013 |
| WO | 2016/013634 A1 | 1/2016 |
| WO | 2016/093750 A1 | 6/2016 |

OTHER PUBLICATIONS

Nitschke, et al., "Display-Camera Calibration from Eye Reflections", vol. J93-D, Issue 8, pp. 1540-1460.
"Automatic Calibration of HUD with Corneal Feedback", 2016 Information Processing Society of Japan SIG Technical Report vol. 2016-CVIM-202, No. 40. May 12, 2015, 08 pages.
Nitschke, et al., "Display-Camera Calibration from Eye Reflections", 1450-1460 pages.
Takahashi, et al., "Extrinsic Camera Calibration of Display-Camera System using Cornea Reflection", IEICE Technical Report MVF20I5-31, Oct. 2015, 61-66 pages.
Takahashi, et al., "Extrinsic Camera Calibration of Display-Camera System Using Cornea Reflection", The Institute of Electronics, Information and Communication Engineers Technical Report, MVE2025-31, 2015, 61-66 pages (English Abstract only).
Nitschke, et al., "Display Camera Calibration from Eye Reflections", vol. J93-D, Issue 8, 1450-1460 pages.
"Automatic Calibration of HUD with Corneal Feedback", Information Processing Society of Japan SIG Technical Report , vol. 2016-CVIM-202, Issue 40, May 12, 2016, 08 pages.

* cited by examiner

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2017/015766 filed on Apr. 19, 2017, which claims priority benefit of Japanese Patent Application No. JP 2016-132389 filed in the Japan Patent Office on Jul. 4, 2016. Each of the above-referenced applications is hereby incorporated herein by reference in its entirety.

TECHNICAL FIELD

The present technology relates to an information processing apparatus, an information processing method, and a program.

BACKGROUND ART

An optically transmissive display apparatus has been widely used in the past. For example, in a display apparatus such as a transmissive head-mounted display (HMD), additional information such as characters and graphic images can be displayed on a transmissive display, so that the additional information can be viewed together with the real environment. Accordingly, it is also possible to realize "augment reality (AR) technique".

For example, in the HMD described in Patent Literature 1, additional information corresponding to the real environment visually recognized by a user is displayed at a position corresponding to a predetermined coordinate system on the transmissive display. The user experiences the AR by visually recognizing the real environment together with the additional information. The position of the displayed additional information is determined on the basis of an image of the real environment, and the line-of-sight direction of the user guided to natural feature points included in the image (paragraphs [0047] and [0048] of the specification of Patent Literature 1).

CITATION LIST

Patent Literature

Patent Literature 1: WO 2013/179427

DISCLOSURE OF INVENTION

Technical Problem

In the HMD described in Patent Literature 1, the position of the displayed additional information is adjusted according to the predetermined coordinate system. Therefore, in the case where the relative positional relationship between the viewpoint and the coordinate system is changed, the position of the displayed additional image is displaced, which is likely to reduce the display accuracy of the transmissive display.

In view of the circumstances as described above, it is an object of the present technology to provide an information processing apparatus, an information processing method, and a program that make it possible to control display of AR image or the like with high accuracy.

Solution to Problem

In order to achieve the above-mentioned object, an information processing apparatus according to an embodiment of the present technology includes an acquisition unit; and a display control unit.

The acquisition unit is capable of acquiring a first image obtained by capturing an image of a real space reflected on a user's eyeball, and a second image obtained by capturing an image related to the real space displayed on a predetermined display unit, the real space displayed on the predetermined display unit being reflected on the eyeball.

The display control unit controls, on a basis of the acquired first image and the acquired second image, image display performed by the predetermined display unit.

In this information processing apparatus, the first image obtained by capturing an image of the real space reflected on the eyeball, and the second image obtained by capturing an image displayed on the predetermined display unit reflected on the eyeball are acquired. Image display performed by the predetermined display unit is controlled on the basis of the acquired first image and the acquired second image. Accordingly, it is possible to control display of an AR image or the like by the display unit with high accuracy.

The acquisition unit may acquire real space information regarding the real space included in a field of view of the user. In this case, the display control unit may display, on a basis of the real space information, the image related to the real space on the predetermined display unit.

Accordingly, it is possible to control display of an AR image or the like by the display unit with high accuracy.

The display control unit may include an image generation unit that acquires location information of one or more reference elements included in the real space and generates the image related to the real space with reference to positions of the one or more reference elements.

Accordingly, it is possible to control display of an AR image or the like by the display unit with high accuracy.

The image generation unit may generate the image related to the real space by a transformation operation of transforming real space coordinates included in the real space information into display coordinates in the predetermined display unit. In this case, the display control unit may include a correction unit that corrects the transformation operation on a basis of a positional relationship between the one or more reference elements included in the first image and the image related to the real space included in the second image.

Accordingly, it is possible to control display of an AR image or the like by the display unit with high accuracy.

The image generation unit may generate an image including one or more markers respectively corresponding to the one or more reference elements. In this case, the correction unit may correct the transformation operation on a basis of a positional relationship between the one or more reference element included in the first image and the one or more markers included in the second image.

Accordingly, it is possible to control display of an AR image or the like by the display unit with high accuracy.

The image generation unit may be capable of adjusting at least one of a shape, size, display density, display color, and luminance of the marker.

Accordingly, it is possible to improve the detection efficiency of the maker and control display of an AR image or the like by the display unit with high accuracy.

The image generation unit may generate an AR image corresponding to the real space. In this case, the correction unit may correct the transformation operation on a basis of a positional relationship between the one or more reference elements included in the first image and the AR image included in the second image.

Accordingly, it is possible to control display of an AR image or the like by the display unit with high accuracy.

The correction unit may correct projective transformation from the real space coordinates into the display coordinates.

Accordingly, it is possible to correct the position, shape, angle, size, and the like of the AR image and control display of an AR image or the like by the display unit with high accuracy.

The predetermined display unit may be a transmissive display disposed to face the eyeball.

Accordingly, it is possible to an AR environment with high quality.

The display control unit may include a light control unit capable of adjusting an amount of light to be transmitted through the transmissive display.

Accordingly, it is possible to control the reflection of the real space on the eyeball and control display of an AR image or the like by the display unit with high accuracy.

The light control unit may regulate, when capturing the second imaging, the amount of light to be transmitted.

Accordingly, the detection efficiency of the marker or the like is improved, and it is possible to control display of an AR image or the like by the display unit with high accuracy.

The display control unit may correct the location information of the one or more reference elements or the image related to the real space on a basis of a detection result by a sensor unit capable of detecting a state of the user.

Accordingly, for example, it is possible to correct displacement or the like of display of an AR image along with the behavior of the user.

The display control unit may include a determination unit that determines whether or not to correct the transformation operation. In this case, the image generation unit and the correction unit operate on a basis of a result by the determination unit.

Accordingly, it is possible to automatically determine the timing of correction and correct display of an AR image of the like under appropriate conditions.

The determination unit may determine whether or not to execute the correction of the transformation operation on a basis of the number and distribution of the one or more reference elements included in the real space.

Accordingly, it is possible to control display of an AR image or the like with high accuracy.

The determination unit may determine whether or not to execute the correction of the transformation operation on a basis of at least one of information regarding a state of the user including a line-of-sight direction and position of the eyeball and change information including a change in the positions of the one or more reference elements.

Accordingly, it is possible to control display of an AR image or the like with high accuracy.

The display control unit may display the one or more markers respectively corresponding to the one or more reference elements while avoiding a gaze area in the predetermined display unit that the eyeball gazes.

Accordingly, it is possible to reduce the burden on the user and improve the feeling of use.

The display control unit may determine whether or not the correction of the transformation operation is necessary, and automatically execute, in a case where it is determined that the correction of the transformation operation is necessary, the correction of the transformation operation.

Accordingly, it is possible to realize automatic correction and exhibit a high operability.

The display control unit may correct distortion derived from a surface shape of the eyeball in the first image and the second image.

Accordingly, it is possible to control display of an AR image or the like by the display unit with high accuracy.

An information processing method according to an embodiment of the present technology is an information processing method executed by a computer system, including: acquiring a first image obtained by capturing an image of a real space reflected on a user's eyeball, and a second image obtained by capturing an image related to the real space displayed on a predetermined display unit, the real space displayed on the predetermined display unit being reflected on the eyeball.

On a basis of the acquired first image and the acquired second image, image display performed by the predetermined display unit is controlled.

A program according to an embodiment of the present technology causes a computer system to execute the steps of: acquiring a first image obtained by capturing an image of a real space reflected on a user's eyeball, and a second image obtained by capturing an image related to the real space displayed on a predetermined display unit, the real space displayed on the predetermined display unit being reflected on the eyeball; and controlling, on a basis of the acquired first image and the acquired second image, image display performed by the predetermined display unit.

Advantageous Effects of Invention

As described above, according to the present technology, it is possible to control display of an AR image or the like with high accuracy. It should be noted that the effect described here is not necessarily limitative and may be any effect described in the present disclosure.

MODE(S) FOR CARRYING OUT THE INVENTION

Hereinafter, embodiments of the present technology will be described with reference to the drawings.

First Embodiment

[Head-Mounted Display]

Figure 1A:
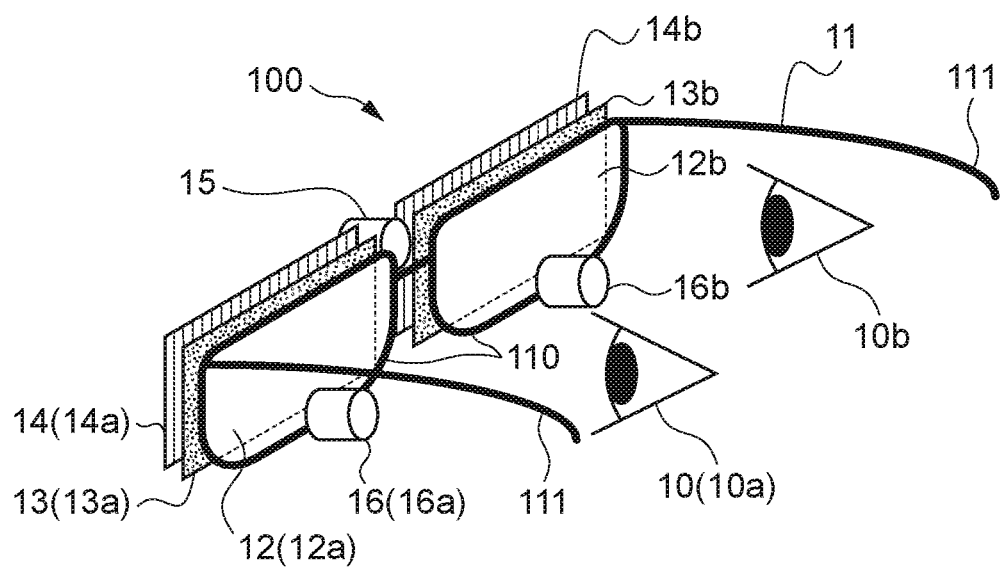
FIGS. 1A and 1B are schematic diagrams showing a configuration example of a head-mounted display (HMD) according to a first embodiment of the present technology.
Figure 1B:
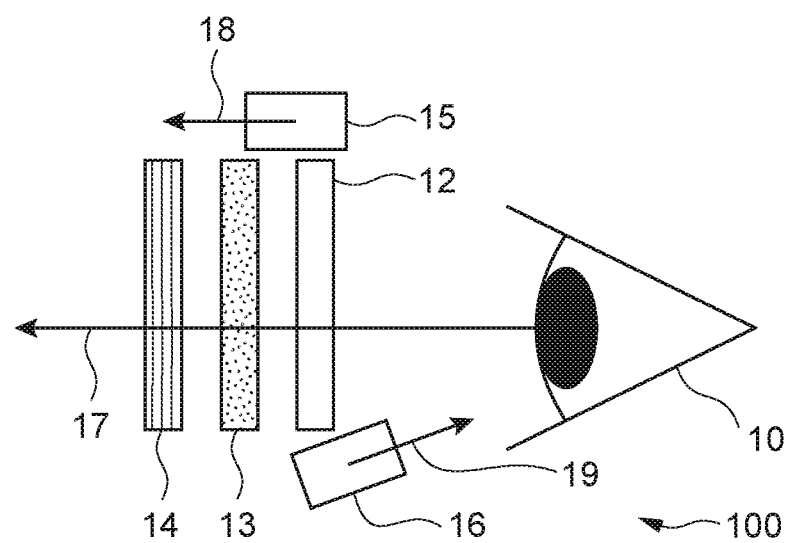

FIGS. 1A and 1B are schematic diagrams showing a configuration example of a head-mounted display (HMD) according to a first embodiment of the present technology. FIG. 1A is a perspective view showing the appearance of an HMD 100. FIG. 1B is a side view for describing a configuration of the HMD 100. The HMD 100 is an eyeglass-type apparatus including a transmissive display, and attached to a user's head for use.

The HMD 100 includes a frame 11, a lens 12, a transmissive display 13, and a light control device 14. Further, the HMD 100 includes a vision sensor 15 and an inward facing camera 16, which are supported by the frame 11.

The frame 11 has an eyeglass shape, and includes rim portions 110 and temple portions 111. The rim portions 110 are portions disposed in front of left and right eyeballs 10a and 10b, and support left and right lenses 12a and 12b, respectively. The temple portions 111 extend rearward from both ends of the rim portions 110 toward both ears of the user, and tips of the temple portions 111 are attached to both ears. The rim portions 110 and the temple portions 111 are formed of, for example, a material such as synthetic resin and metal.

The lenses 12a and 12b are respectively disposed in front of the eyeballs 10a and 10b so as to cover at least a part of the user's field of view. Typically, the lens 12 is designed to correct the user's vision. It goes without saying that the present technology is not limited thereto, and a so-called lens without optical correction may be used.

The transmissive display 13 is supported by the rim portions 110, and includes two transmissive displays disposed so as to face the left and right eyeballs 10a and 10b. That is, transmissive displays 13a and 13b are respectively disposed outside the left and right lenses 12a and 12b. In this embodiment, the transmissive displays 13 each have a size substantially equal to that of each lens 12. However, the present technology is not limited to, and the transmissive display 13 may be disposed so as to cover a part of the area of the lens 12.

A user wearing the HMD 100 is capable of watching, for example, the view in which an image displayed on the transmissive display 13 is superimposed on the real world. Further, by displaying an AR image on the transmissive display 13, it is also possible to experience various types of AR.

The specific configuration of the transmissive display 13 is not limited, and an organic EL display, an LCD (Liquid Crystal Display) display, or the like is used. In this embodiment, the transmissive display 13 corresponds to a predetermined display unit.

The light control device 14 is supported by the rim portions 110, includes light control devices (14a and 14b) disposed outside the transmissive display 13. The light control device 14 is capable of adjusting the amount of light to be transmitted therethrough. Therefore, by controlling the transmittance of the light control device 14, it is possible to adjust the amount of light to be transmitted through the transmissive display 13. The specific configuration of the light control device 14 is not limited, and, for example, a light control glass or light control sheet whose transmittance can be electrically controlled, which uses a liquid crystal or the like, is used. Alternatively, a mechanically operating shutter or the like may be used as the light control device 14.

Also the control range and the like of the transmittance are not limited. For example, an arbitrary transmittance may be realized between the transmittance of 0% to 100%. Alternatively, a predetermined value in the range may be set. For example, it is possible to select any of the transmittances of 0%, 20%, 40%, 60%, 80%, and 100%. Further, it may be possible to switch only two transmittances of approximately 0% and approximately 100%.

The vision sensor 15 is installed substantially at the center of the rim portions 110 so as to face outward. As shown in FIG. 1B, a line-of-sight direction 17 of the eyeballs 10 and a sensing direction 18 of the vision sensor 15 are substantially similar to each other. Therefore, the sensing area of the vision sensor 15 is substantially similar to viewing area of the user.

Figure 2:
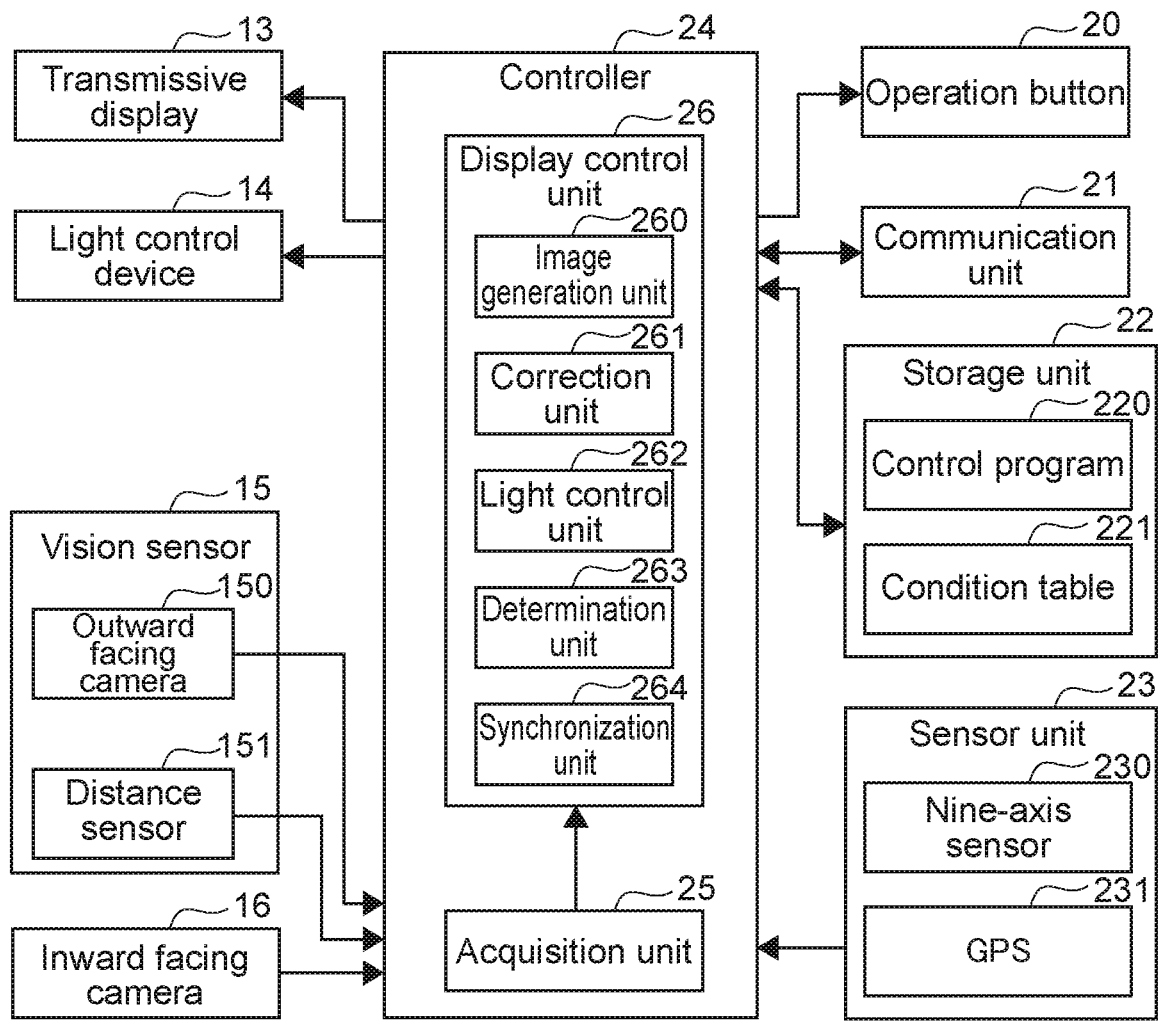
FIG. 2 is a block diagram showing a functional configuration example of the HMD according to this embodiment.

The vision sensor 15 includes an outward facing camera 150 and a distance sensor 151 (see FIG. 2). The outward facing camera 150 images the viewing area (sensing area) of the user at a predetermined frame rate. That is, it is possible to capture an image of the real space included in the user's field of view. As the outward facing camera 150, for example, a digital camera including an image sensor such as a CMOS (Complementary Metal-Oxide Semiconductor) sensor and a CCD (Charge Coupled Device) sensor is used.

The distance sensor 151 detects information regarding the distance to an object in the real space existing in the viewing area, and outputs depth information. The distance sensor 151 includes various sensors using a millimeter wave radar, an infrared laser, and the like.

By using a real-space image captured by the outward facing camera 150 and the depth information, a depth map of the viewing area can be generated. Further, three-dimensional coordinates can be set for each point of an object in the viewing area. The specific configuration of the vision sensor 15 and the method of generating a depth map are not limited. For example, a depth map may be generated on the basis of an image captured using a stereo camera or the like. In this embodiment, the depth map and the three-dimensional coordinates respectively correspond to real-space information regarding a real space and real-space coordinates.

The inward facing camera 16 is supported by the rim portions 110. The inward facing camera 16 includes inward facing cameras 16a and 16b respectively provided for the left and right eyeballs 10a and 10b. As shown in FIG. 1B, the imaging direction 19 of the inward facing camera 16 is directed to the eyeballs 10, it is possible to capture an image reflected on each of the eyeballs 10. As the inward facing camera 16, for example, a digital camera including an image sensor such as a CMOS and CCD is used.

FIG. 2 is a block diagram showing a functional configuration example of the HMD 100 according to this embodiment. The HMD 100 further includes an operation button 20, a communication unit 21, a storage unit 22, a sensor unit 23, and a controller 24.

The operation button 20 is provided at a predetermined position of the frame 11 (illustration is omitted). With the operation button 20, it is possible to execute operations related to various functions of the HMD 100 such as turning ON/OFF of a power source, switching display on the transmissive display 13, and a network communication function.

The communication unit 21 is a module for executing network communication, short-range wireless communication, and the like with another device. For example, a wireless LAN module such as WiFi, a communication module such as Bluetooth (registered trademark), or the like is provided.

The storage unit 22 is a non-volatile storage device, and, for example, an SSD (Solid State Drive) or the like is used. In the storage unit 22, a control program 220 for controlling the operation of the entire HMD 100 is stored. Further, in the storage unit 22, a condition table 221 is stored. In the condition table 221, conditions for correcting display on the transmissive display 13 are recorded. The method of installing the control program 220 and the condition table 221 in the HMD 100 is not limited.

The sensor unit 23 includes a nine-axis sensor 230 and a GPS sensor 231. The nine-axis sensor 230 outputs changes in angle, movement, and orientation of the main body of the HMD 100. The GPS sensor 231 outputs location information of the main body of the HMD 100. On the basis of these pieces of information, it is also possible to detect information regarding the user's state including the posture, movement, and the like of the user.

Further, in this embodiment, also the vision sensor 15 and the inward facing camera 16 function as a part of the sensor unit 23. For example, by an image or the like captured by the inward facing camera 16, it is possible to detect eyeball information including the line-of-sight direction 17 and position of the eyeballs 10 as the information regarding the user's state.

The type of the sensor provided as the sensor unit 23 is not limited, and an arbitrary sensor may be provided. For example, a biosensor or the like capable of detecting the user's body temperature, pulse rate, and the like may be provided.

Also the information regarding the user's state detected by the sensor unit 23 is not limited, and, for example, exercise information regarding the hyperemia state of the eyeball, the number of blinks (included in the above-mentioned eyeball information), walking, travelling, travelling by train, driving, and the like is acquired. Also information regarding the type of sport that the user is playing and the like can be acquired. Further, also information regarding the current location of the user, and more detailed information regarding whether it is indoors or outdoors, whether a conference is in progress, or the like, can be acquired.

The controller 24 controls the operation of the respective blocks of the HMD 100. The controller 24 has a hardware configuration necessary for a computer, such as a CPU and a memory (RAM and ROM). Various types of processing are executed by the CPU loading the control program 220 stored in the storage unit 22 into the RAM and executing it.

As the controller 24, for example, a PLD (Programmable Logic Device) such as FPGA (Field Programmable Gate Array) or another device such as an ASIC (Application Specific Integrated Circuit) may be used.

In this embodiment, the CPU of the controller 24 executes the program according to this embodiment, thereby realizing functional blocks, i.e., an acquisition unit 25 and a display control unit 26. The acquisition unit 25 acquires an eyeball image of the eyeballs 10 output from the inward facing camera 16. The display control unit 26 controls display on the transmissive display 13 on the basis of the eyeball image acquired by the acquisition unit 25.

Therefore, in this embodiment, the information processing method according to this embodiment is executed by the controller 24. Note that dedicated hardware may be appropriately used for realizing the acquisition unit 25 and the display control unit 26.

The display control unit 26 includes, as functional blocks, an image generation unit 260, a correction unit 261, a light control unit 262, a determination unit 263, and a synchronization unit 264.

The image generation unit 260 generates an image in accordance with display coordinates that are coordinates of the transmissive display 13. In this embodiment, the image generation unit 260 generates an image using projective transformation. For example, the image generation unit 260 uses projective transformation to transform three-dimensional coordinates into two-dimensional coordinates. The method of generating an image in accordance with display coordinates and a model defining projective transformation are not limited. As projective transformation, for example, projective transformation based on a perspective projection model with an eyeball as a viewpoint is used. In this embodiment, the projective transformation corresponds to a transformation operation.

In this embodiment, the image generation unit 260 acquires positional information of one or more reference elements included in the real space, and an image related to the real space is generated with reference to the positions of the one or more reference elements. This point will be described in detail later.

The correction unit 261 corrects the projective transformation on the basis of an eyeball image of the eyeballs 10 captured by the inward facing camera 16. The projective transformation corrected by the correction unit 261 is newly used for generating an image in the generation unit 260.

The light control unit 262 controls the transmittance of the light control device 14 to adjust the amount of light transmitted through the transmissive display 13. Therefore, with the light control unit 262, it is possible to regulate the amount of light transmitted through the transmissive display 13. With the light control unit 262, it is possible to change the condition of capturing an image reflected on the eyeballs 10. Note that the transmittance of the light control device 14 may be controlled depending on the intensity of external light. Specifically, in the case where the intensity of external light is relatively large, the amount of light transmitted through the transmissive display 13 may be reduced by controlling the transmittance of the light control device 14, as compared with the case where the intensity of external light is relatively small. Accordingly, it is possible to suppress the reduction in visibility of an AR image due to external light in the outdoors.

The determination unit 263 determines whether or not to execute correction of the projective transformation by the correction unit 261. The determination by the determination unit 263 is performed on the basis of the condition table 221 stored in the storage unit 22. The display control unit 26 executes the control program 220 for correcting the projective transformation on the basis of the determination result by the determination unit 263.

The synchronization unit 264 controls the operation timing of the vision sensor 15, the inward facing camera 16, and the light control device 14 on the basis of the control program 220 stored in the storage unit 22.

Figure 3:
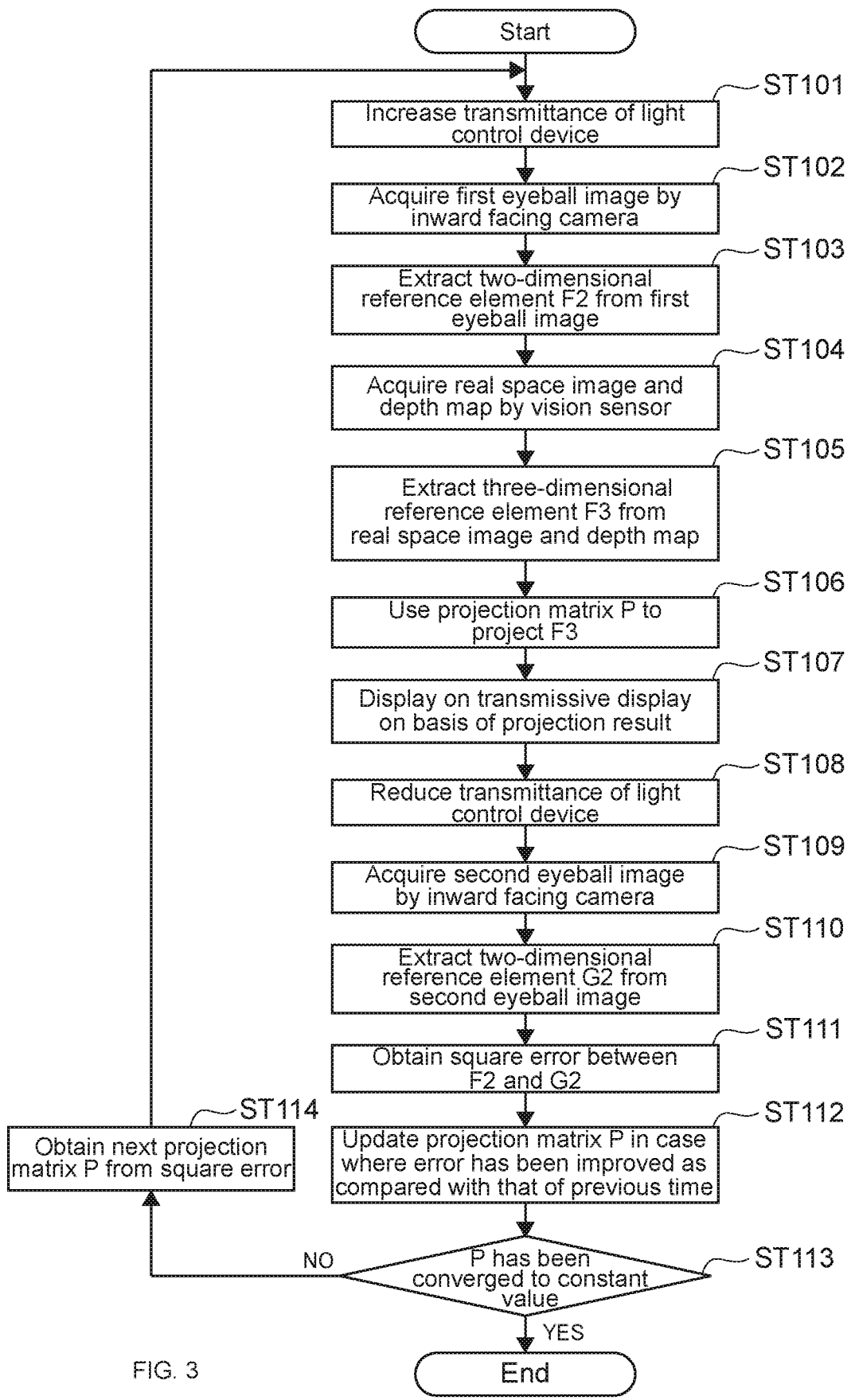
FIG. 3 is a flowchart showing an example of control of image display in a transmissive display in the HMD according to this embodiment.
Figure 4:
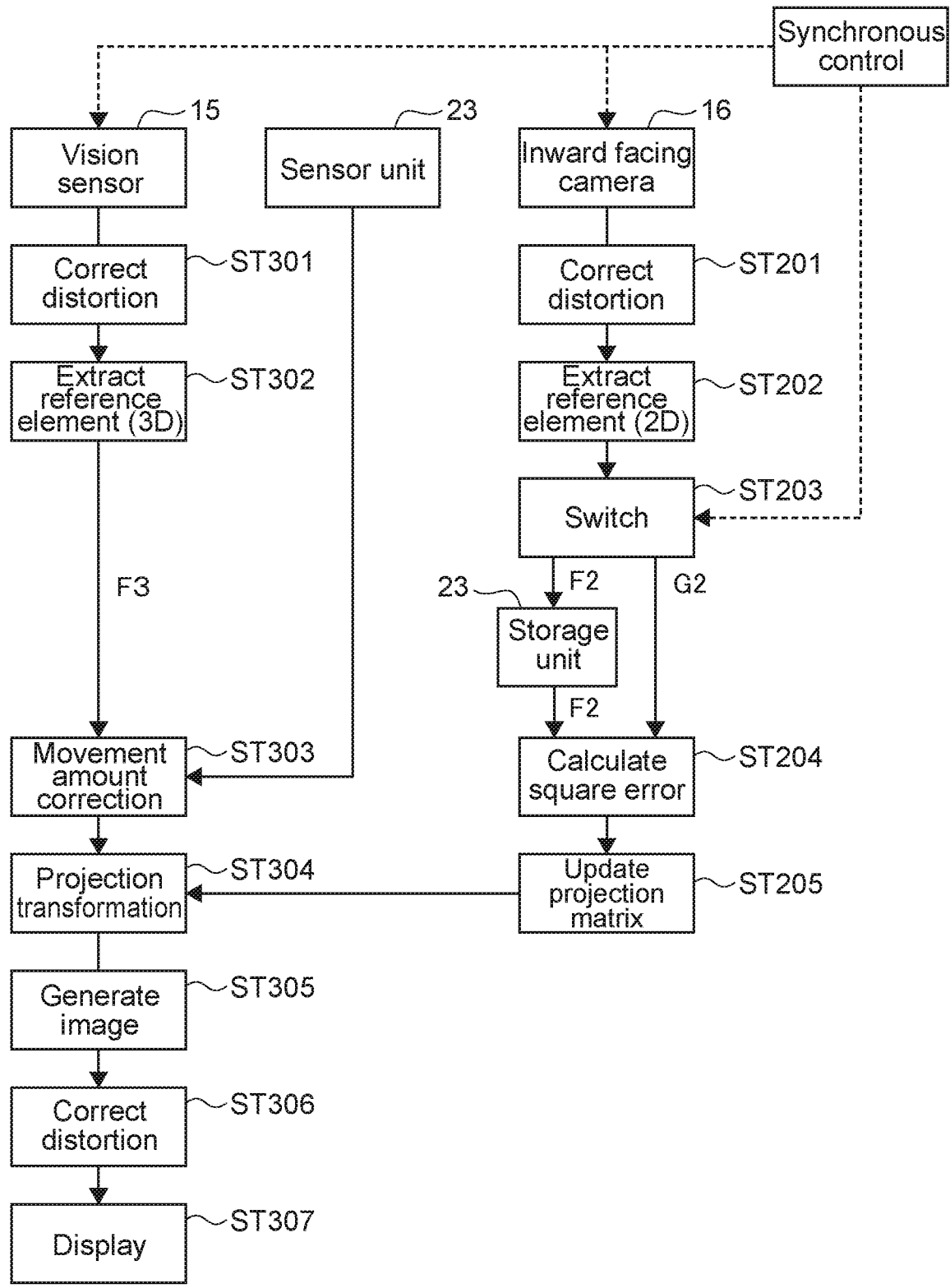
FIG. 4 is a block diagram showing a data flow in the control of image display.

FIG. 3 is a flowchart showing an example of control of image display in the transmissive display 13 in the HMD 100 according to this embodiment. FIG. 4 is a block diagram showing a data flow in the control of image display.

In this embodiment, as the control of image display, correction of a projection matrix is executed according to the flowchart shown in FIG. 3. Specifically, a correction routine from Step 101 to Step 114 is repeated. By correcting the projection matrix, the image display on the transmissive display 13 is controlled, and it is possible to display an AR image or the like with high accuracy.

First, the light control unit 262 increases the transmittance of the light control device 14 (Step 101). The view of the real space is projected on the eyeballs 10 through the light control device 14, the transmissive display 13, and the lens 12. That is, an image of the real world that the user is watching is projected through the HMD 100.

The inward facing camera 16 images the eyeballs 10 on which the view of the real space is reflected to generate a first eyeball image. The acquisition unit 25 acquires the generated first eyeball image (Step 102). At this time, the distortion of the first eyeball image due to surfaces of the lens 12 and the eyeballs 10 is corrected (Step 201). Accordingly, it is possible to control image display with high accuracy.

Figure 5:
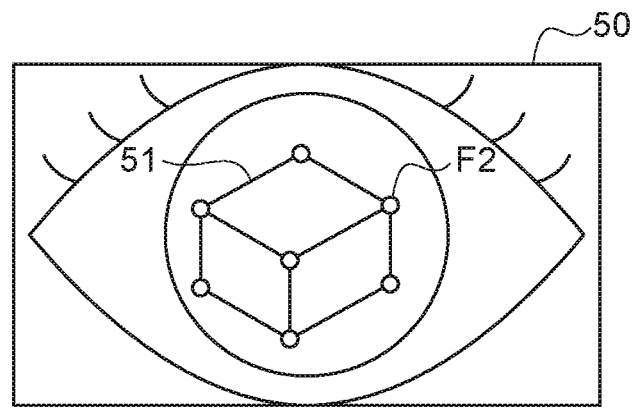
FIG. 5 is a schematic diagram showing an example of a first eyeball image.

FIG. 5 is a schematic diagram showing an example of the first eyeball image. In this embodiment, assumption is made that a rectangular parallelepiped 51 exists in the view of the real space that the user is watching. Therefore, a first eyeball image 50 includes an image of the rectangular parallelepiped 51 reflected on the eyeballs 10.

The image generation unit 260 extracts a reference element F2 included in the first eyeball image 50 (Step 103 and Step 202). Here, the reference element is a reference element at the time of comparison with a second eyeball image to be described later, and typically, a characteristic portion such as an edge portion in the image corresponds to the reference element. For example, elements such as the edge (corner), rim (line/contour), and surface (area) of an object in the image corresponds to the reference element. The method of detecting the reference element F2 and the type and number of elements to be detected are not limited. For example, as the method of detecting a corner, a method of image processing such as the Harris method and the KLT method may be used.

Typically, a plurality of reference elements F2 are extracted. In this embodiment, vertices of the rectangular parallelepiped 51 are extracted as the plurality of reference element F2. In FIG. 5, the position coordinate data thereof is indicated by the same symbol F2. As shown in FIG. 4, the two-dimensional position coordinates of the extracted reference element F2 are stored in the storage unit 23 through switching processing (step 203).

In the switching processing, data processing related to the reference element to be output is appropriately selected in synchronization with the imaging operation by the inward facing camera 16. Specifically, in the case where the inward facing camera 16 captures the first eyeball image 50, the generated reference element F2 is stored in the storage unit 23. Meanwhile, in the case where the inward facing camera 16 captures the second eyeball image to be described later, a generated reference element G2 is output to the next Step 204.

The vision sensor 15 generates a real space image and a depth map, and the acquisition unit 25 acquires them (Step 104). The distortion due to the vision sensor 15 in the acquired real space image and depth map is corrected (Step 301).

A reference element F3 is extracted from the corrected real space image and depth map (Step 105, Step 302). In this embodiment, vertices of the rectangular parallelepiped 51 in the real space are extracted as a plurality of reference elements F3, and the three-dimensional coordinates thereof are calculated.

Note that in this embodiment, as shown in FIG. 4, the synchronization unit 264 synchronously controls the vision sensor 15 and the inward facing camera 16. That is, imaging of the first eyeball image 50 and sensing by the vision sensor 15 are controlled to be performed at the same timing. Accordingly, it is possible to extract the reference elements F2 and F3 corresponding to each other with high accuracy.

Further, as shown in FIG. 4, movement amount correction is executed on the basis of the detection result by the sensor unit 23 (Step 303). For example, assumption is made that in the case where time lag occurs in the synchronous control, a user moves, or changes the orientation of the face during the period from imaging of the first eyeball image 50 to sensing by the vision sensor 15. In this case, the sensing area of the vision sensor 15 is displaced. Therefore, in the case where the sensor unit 23 detects the user's movement or the like, the location information of the reference element F3 is corrected on the basis of the detection result. Accordingly, it is possible to determine the correspondence between the location information of each reference element F2 and the three-dimensional coordinates of each reference element F3 with high accuracy.

The method of detecting the movement amount is not limited. For example, information regarding space surrounding a user may be generated by using SLAM (Simultaneous Localization and Mapping) technology, and the movement and change in the posture of the user, and the like in the space may be detected. Accordingly, it is possible to detect the behavior of the user with reference to surrounding objects or the like, and it is possible to determine the movement amount with high accuracy.

The image generation unit 260 uses a projection matrix P to project the three-dimensional coordinates of each reference element F3 on the display coordinates (Step 106, Step 304). In this embodiment, as show in the following formula, the projection matrix P is expressed as the sum of a reference matrix P0 and a correction matrix ΔP.

$P=P0+\Delta P$

Here, the projection matrix P corresponds to a matrix obtained by changing the reference matrix P0 by the amount corresponding to the correction matrix P0. Note that the projection matrix P is not limited to the sum of the reference matrix P0 and the correction matrix ΔP, and may be defined by using other operations such as product and quotient. In this embodiment, in one routine, the reference matrix P0 and the correction matrix ΔP are updated, and a reference matrix P0' and a correction matrix ΔP' to be used next are calculated. Accordingly, a projection matrix P' to be used next is newly generated (P'=P0'+ΔP').

The image generation unit 260 generates a marker image including one or more markers corresponding to the one or more projected reference elements F3 (Step 305). The generated marker image is displayed on the transmissive display 13.

Figure 6:
FIG. 6 is a schematic diagram showing an example of a marker image.

FIG. 6 is a schematic diagram showing an example of the marker image. Note that the shape of a marker M2 corresponding to the reference element F3, the method of generating it, and the like are not limited. For example, the image generation unit 260 is capable of adjusting the shape, size, display density, display color, luminance, and the like of the marker M2. Accordingly, it is possible to improve the extraction accuracy of the marker.

Further, the reference element F3 to be used may be appropriately selected on the basis of the spatial distribution of the reference element F3 or the like. For example, in the case where the distribution density of the reference element F3 is high, it is possible to display the marker with a density suitable for extraction by appropriately selecting the reference element F3 to be used. Accordingly, it is possible to improve the extraction accuracy of each marker. Further, it is possible to eliminate the reference element F3 having a large depth information error in the depth map. Accordingly, it is possible to select the reference element F3 with high reliability, and improve the correction accuracy of the projection matrix P. Note that in this embodiment, a marker image 52 corresponds to an image related to the real space.

The image generation unit 260 corrects the distortion of the marker image 52 on the basis of information regarding the shape of the transmissive display 13, deformation of the image due to the lens 12, and the like, which is previously acquired (Step 306). Accordingly, it is possible to control display with high accuracy. Then, by the display control unit 26, the corrected marker image 52 is displayed on the transmissive display 13 (Step 107, Step 307).

The light control unit 262 reduces the transmittance of the light control device 14 (step 108). Accordingly, projection of the view of the real space on the eyeballs 10 is restrained, and the marker image 52 displayed on the transmissive display 13 is mainly displayed on the eyeballs 10. Accordingly, the extraction accuracy of the marker M2 is improved. The timing of reducing the transmittance of the light control device 14 is synchronously controlled by the synchronization unit 264 together with the timing of the switching processing in the data flow shown in FIG. 4.

Note that the method of controlling the transmittance of the light control device 14 by the light control unit 262 is not limited. For example, the reflection of the marker image 52 on the eyeballs 10 differs in the indoor and outdoor due to influence of external light. The transmittance of the light control device 14 may be appropriately set on the basis of how the marker image 52 is reflected on the eyeballs 10. Accordingly, it is possible to set the optimal transmittance for extracting the marker M2 depending on the situation, and extract the marker M2 with high accuracy.

The inward facing camera 16 images the eyeballs 10 on which the marker image 52 is reflected to generate a second eyeball image. The acquisition unit 25 acquires the generated second eyeball image (Step 109). Then, similarly to Step 102, the distortion of the second eyeball image is corrected (Step 201).

Figure 7:
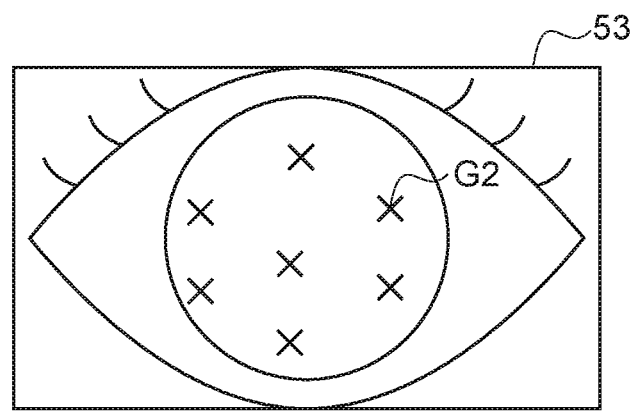
FIG. 7 is a schematic diagram showing an example of a second eyeball image.

FIG. 7 is a schematic diagram showing an example of the second eyeball image. The image generation unit 260 extracts a plurality of reference elements G2 included in a second eyeball image 53 (Step 110, Step 202). In this embodiment, one or more markers M2 appearing in the second eyeball image 53 are extracted as one or more reference elements G2. The position coordinates of the extracted reference element G2 are output to Step 204 through switching processing (Step 203).

The correction unit 261 compares the reference element F2 and the reference element G2 stored in the storage unit 23. In this embodiment, both the reference element F2 and the reference element G2 correspond to each vertex of the rectangular parallelepiped 51. The correction unit 261 first calculates a pair of the reference element F2 and the reference element G2 corresponding to the same vertex. The method of calculating the pair is not limited. For example, a matching method such as RANSAC (Random Sample Consensus) and a minimum median method may be used.

In the case where the rectangular parallelepiped 51 displayed on the transmissive display 13 is superimposed on the rectangular parallelepiped 51 viewed through the transmissive display 13, the following relational expression is satisfied.

$$F2i=G2i=Q(P(F3i))$$

Here, a suffix i is a code representing each pair. Further, Q represents a projection matrix from the transmissive display 13 to the eyeballs 10. In the present technology, the reference element F2 and the reference element G2 are extracted on the basis of the eyeball image captured by the inward facing camera 16. Therefore, it is possible to calculate the projection matrix P without calculating the projection matrix Q.

The correction unit 261 calculates a square error δ that is an index representing the overlapping degree between the reference element F2 and the reference element G2. Specifically, for each pair, the square error δ of the location information is calculated as follows (step 111, Step 204).

$$\delta=Z(F2i-G2i)^2=E(F2i-Q(P(F3i)))^2$$

Here, the sum Z is calculated for all the pairs. In general, there is a tendency that the two overlap well with each other as a whole in the case where the square error δ is small and deviation is observed as a whole in the case where the square error δ is large.

Note that the index representing the overlapping degree between the reference element F2 and the reference element G2 is not limited. For example, errors by direction, errors by distance, and the like may be used as the index. That is, the square error δ may be calculated separately in the coordinate direction. Accordingly, the overall deviation caused by parallel movement or the like can be easily detected, and the projection matrix P can be corrected with high accuracy. Since the correction accuracy is improved in this way, it is possible to reduce the number of necessary correction routines.

The correction unit 261 determines whether the projection error of the projection matrix P has been improved or deteriorated as compared with that of the previous time, on the basis of the square error δ. Specifically, the square error δ of the previous time and the square error δ of the present time are compared. It is determined that the projection error has been improved in the case where the value of the square error δ is reduced as compared with that of the previous time, and that the projection error has been deteriorated in the case where the value is increased.

The correction unit 261 updates the projection matrix P on the basis of the determination result of the projection error (Step 112). In the case where it is determined that the projection error has been improved, the projection matrix P of the present time is set as the reference matrix P0' to be used next. Specifically, the reference matrix P0' to be used next is calculated as follows.

$$P0'=P=P0+\Delta P$$

Note that the correction matrix ΔP is not updated at this timing.

In the case where it is determined that the projection error has been deteriorated, it is set to use the same reference matrix P0 as that of the present time as the reference matrix P0' to be used next, and updating is not performed.

The correction unit 261 determines whether or not the projection matrix P has been converged to a constant value (Step 113). In this embodiment, in the case where it is determined that the projection has been improved in Step 112, a coefficient α is set depending on the improvement width, and the convergence of the projection matrix P is determined on the basis of the absolute value of the coefficient α. The coefficient α is a coefficient for calculating the correction matrix ΔP' to be used next (see Step 114), and is, for example, a parameter correlated with the value of the improvement width. In the case where the absolute value of the coefficient α is not more than a predetermined threshold value, i.e., the improvement width is within a predetermined range, it is determined that the projection matrix P has been converged to the constant value. Note that the specific method of calculating the coefficient α is not limited.

Alternatively, the square mean of the coefficients α obtained up to the present time may be calculated to determine that the projection matrix P has been converged in the case where the square mean is continuously not more than a predetermined threshold value a predetermined number of times. Alternatively, it may be determined that the projection matrix P has been converged in the case where the reference matrix P0 is continuously not updated a predetermined number of times. The method of determining the convergence of the projection matrix P is not limited.

The correction unit 261 determines whether or not to finish the routine on the basis of the determination result in Step 113. In the case where it is determined that the projection matrix P has been converged to the constant value (YSE in Step 113), the correction routine is finished. Further, in the case where it is determined that the projection matrix P has not been converged to the constant value (No in Step 113), the correction routine is continued.

In the case where the correction routine is continued, the correction unit 261 generates the projection matrix P' to be used next (step 114, Step 205). Here, the correction matrix ΔP' to be used next is calculated. Note that although a dash is added to the matrix to be used next in the specification, no dash is added to express the routine in the flowchart of FIG. 3.

In the case where it is determined that the projection error has been improved in Step 112, the correction matrix ΔP' is calculated as follows on the basis of the above-mentioned coefficient α depending on the improvement width.

$$\Delta P' = \alpha \Delta P$$

In the case where it is determined that the projection error has been deteriorated, the correction matrix ΔP' to be used next is randomly selected from predetermined candidates. The method of setting the coefficient α and the method of selecting the correction matrix ΔP' to be used next are not limited.

The sum of the reference matrix P0' and the correction matrix ΔP' to be used next is generated as the projection matrix P' to be used next (P'=P0'+ΔP'). Then, Step 101 and subsequent Steps are repeated. As described above, the correction unit 261 according to this embodiment corrects the projection matrix P on the basis of the positional relationship between the one or more reference elements F2 included in the first eyeball image 50 and the marker image 52 included in the second eyeball image 53.

Note that in this embodiment, the projection matrix P has been defined by the reference matrix P0 and the correction matrix ΔP and the projection matrix P has been corrected using the gradient method. It goes without saying that the method of correcting the projection matrix P is not limited and another method may be used.

As described above, in the HMD 100 according to this embodiment, the first eyeball image 50 obtained by imaging the real space reflected on the eyeballs 10, and the second eyeball image 53 in which the marker image 52 displayed on the transmissive display 13 is reflected on the eyeball are acquired. The image display by the transmissive display 13 is controlled on the basis of the first eyeball image 50 and the second eyeball image 53. Accordingly, it is possible to control display of an AR image or the like by the transmissive display 13 with high accuracy.

It is conceivable to calibrate the image display by the display using only an observation camera or the like that images the real space. In this case, the image display of an AR image or the like is calibrated on the basis of the image of the real space captured by the observation camera or the like. However, since there is a possibility that optical characteristics such as the viewpoint, the focal length, and the angle of view differ between the user's eye and the observation camera, and the image of the real space and the user's field of view is not necessarily equal to each other. Therefore, the alignment between the reality (real space) and the virtual object (AR image) on the user's retina cannot be assured.

Further, since the position of the eyeball, the shape of the eyeball, the height of the nose, and the like differ depending on the individual, the appearance of the display differs for each individual. Further, the appearance of the display is changed due to of the crooked HMD or the like. Further, in calibration using only the observation camera or the like, it is difficult to deal with such individual difference and change in the positional relationship between the display and the eyeball.

Further, in the case where the positional relationship between the display and the observation camera or the like is mechanically displaced, calibration is necessary again. At that time, in the case where a specific marker for the calibration apparatus is necessary, for example, the user himself/herself cannot correct it, and needs to move to the place of the calibration apparatus to perform a correction operation.

Meanwhile, in the HMD 100 according to the present technology, the inward facing camera 16 captures the first and second eyeball images 50 and 53. In the first and second eyeball images 50 and 53, the view that the user is watching through the HMD 100 appears. Therefore, by comparing the first and second eyeball images 50 and 53, it is possible to detect how the marker image 52 displayed on the transmissive display 13 is superimposed on the real space (rectangular parallelepiped 51) in the user's field of view with high accuracy. That is, it is possible to align the reality (real space) and the virtual object (AR image) on the user's retina. As a result, it is possible to correct the projection matrix P with high accuracy, and display an AR image or the like with high accuracy.

Further, since the alignment on the retina of the eyeballs 10 can be performed on the basis of the first and eyeball images 50 and 53, it is possible to execute calibration with high accuracy regardless of the individual difference and change in the positional relationship between the transmissive display 13 and the eyeballs 10. That is, it is possible to eliminate the individual difference between users, such as the position of the eyeball, the shape of the eyeball, and the height of the nose, and further to control display of an AR image or the like by the transmissive display 13 with high accuracy. Further, it is also possible to eliminate the deviation in image display due to the crooked HMD 100 or the like.

In the case where the vision sensor 15 and the transmissive display 13 are mechanically displaced in the HMD 100, there is a possibility that image display on the transmissive display 13 based on the real space information is deviated. However, since the projection matrix P can be corrected with high accuracy on the basis of the first and second eyeball images 50 and 53, also the deviation of image display due to the mechanical displacement is sufficiently corrected.

Therefore, calibration can be continued also in the case where mechanical displacement occurs in the HMD 100, and the reliability of the HMD 100 is improved.

Further, in this HMD 100, image display is calibrated using a reference element included in the real space. For this reason, a specific marker or the like for the calibration apparatus is not necessary. Therefore, it is possible to reduce the burden on the user such as preparation of the calibration environment and improve the feeling of use the HMD 100.

Further, in this embodiment, it is possible to automatically control the timing at which image display is calibrated, on the basis of the number of reference elements included in the user's field of view and spatial distribution of the reference elements. For example, the determination unit 263 shown in FIG. 2 determines whether or not to correct the transformation operation, on the basis of the number and distribution of one or more reference elements. In the case where there are more than a certain number of reference elements, the transformation operation of the projection matrix P or the like can be corrected with high accuracy. Further, in the case where the reference elements are distributed thoroughly top and bottom, left and right regardless of distance, it is possible to perform correction with high accuracy in all directions. For example, these conditions can be adopted as conditions for executing correction.

Meanwhile, in the case where the number of reference elements is small or the reference elements are spatially biased, there is a possibility that the correction accuracy is reduced. Therefore, in this case, it is determined that it is not timing to execute correction. By appropriately controlling the timing of correcting the transformation operation, it is possible to improve the accuracy of calibration. Note that the determination by the determination unit 263 is executed on the basis of, for example, the condition recorded in the condition table 221. Further, the condition as a reference of the determination is not limited, and may be appropriately set.

The timing to perform calibration may be controlled by checking the frequency of changing of the line-of-sight direction 17, the degree of change in the reference element, and the like. For example, by using the inward facing camera 16 and the sensor unit 23, the number of blinks of the user, the movement frequency of the line-of-sight direction 17 (eyeballs 10), the user's motion state, and the like can be detected as the information regarding the user's state. Further, by using the vision sensor 15 or the like, vibration and movement of the reference element, flicker and color change of the reference element, and the like can be detected as the change information of the reference element.

For example, the determination unit 263 may determine whether or not to correct the transformation operation, on the basis of at least one of the information regarding the user's state including the line-of-sight direction 17 and position of the eyeballs 10, and the change information including the change in the position of the one or more reference elements. It is possible to improve the accuracy of calibration by using the timing when changes in the line-of-sight direction and reference elements are small and stable as the timing to execute correction.

Second Embodiment

An HMD according to a second embodiment of the present technology will be described. In the following description, description of configurations and operations similar to those in the HMD 100 described in the above-mentioned embodiment will be omitted or simplified.

In the first embodiment, the marker image 52 displayed the transmissive display 13 has been used to control image display. In this embodiment, instead of the marker image, an AR image superimposed on the real space is used to control image display.

Figure 8A:
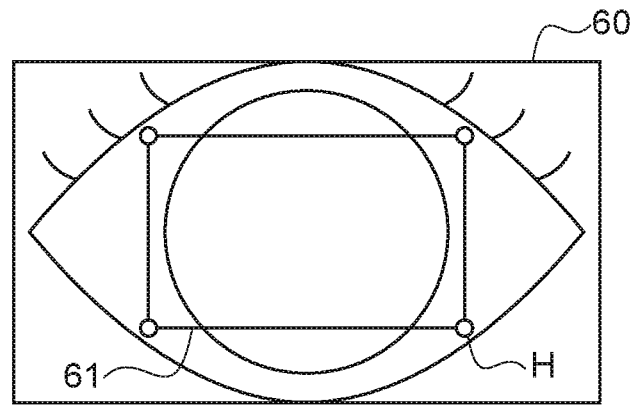
FIGS. 8A, 8B, and 8C are schematic diagrams for describing an example of control of image display using an AR image.
Figure 8B:
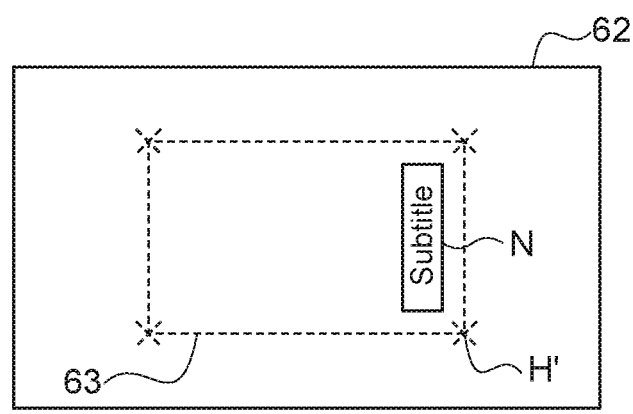
Figure 8C:
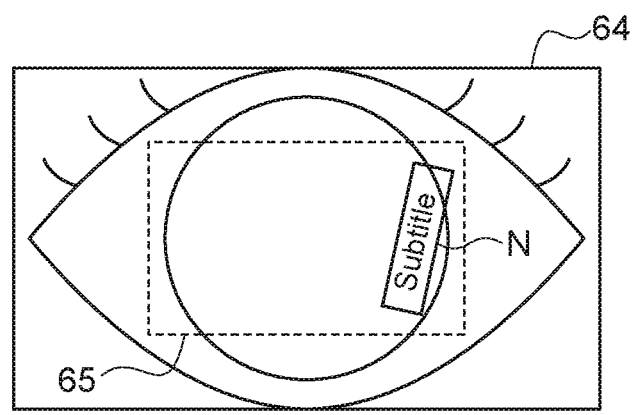

FIGS. 8A, 8B, and 8C are schematic diagrams for describing an example of control of image display using an AR image. Here, description will be made by using a case where a subtitle is superimposed on a movie screen as an AR image as an example.

FIG. 8A is a schematic diagram showing an example of a first eyeball image 60. In the first eyeball image 60, a screen 61 within the user's field of view is displayed. Four vertices of the screen 61 are extracted as reference elements H from the first eyeball image 60 (which corresponds to Step 103 in FIG. 3).

FIG. 8B is a diagram showing a display example of a subtitle (AR image 62) by the transmissive display 13. In this embodiment, the display position of a subtitle N is calculated on the basis of the positions of the reference elements H in the first eyeball image 60. For example, the position of the screen 61 on the transmissive display 13 (wavy line frame 63) is estimated on the basis of the positions of the reference elements H of the vertices, and information regarding a favorable position (display position) of the subtitle N with respect to the position of the screen is calculated. Note that as the method of calculating the display position of the subtitle N based on the first eyeball information 60, another method may be used.

The information regarding the position of the marker (wavy line cross mark H') described in the first embodiment may be calculated, and the display position of the subtitle N may be used for the calculation. For example, by using a depth map that is the output of the vision sensor 15, the real space coordinates of vertices (reference elements) of the screen 61 on the real space are calculated. By transforming the real space coordinates into the display coordinates, the information regarding the position of the marker can be calculated. Accordingly, it is possible to acquire information regarding the shape, size, position, and the like of the screen 61 with high accuracy, and calculate the display position of the subtitle N with high accuracy.

Note that although the estimated position (wave line 63) of the screen and the marker position H' described above are illustrated by a wave line in FIG. 8B for the sake of clarity of description, only the subtitle N that is an AR image is displayed on the transmissive display 13.

In the case where the subtitle N is displayed on the transmissive display 13, the transmittance of the light control device 14 is adjusted, and reflection of the screen 61 on the eyeballs 10 is restrained. Then, the inward facing camera 16 captures the second eyeball image (which corresponds to Step 107 to Step 109 in FIG. 3).

FIG. 8C is a schematic diagram showing an example of a second eyeball image 64 in which the subtitle N appears. The position of the subtitle N in the second eyeball image 64 and the position of the screen (wave line frame 65) are compared with each other, and the positional deviation, distortion, and the like of the subtitle N are detected. Note that the position of the screen can be calculated on the basis of the positions of the four reference elements H of the first eyeball image 60.

The correction unit corrects the deviation and distortion of the subtitle N. Here, the method of correcting the subtitle N is not limited. For example, it is possible to correct the subtitle N by executing rotation and transition processing and the like on the subtitle N, on the transmissive display 13.

The rotation and transition processing may be used for the subsequent display of an AR image or the like.

Further, in the case where the display position of the subtitle N on the transmissive display 13 is calculated on the basis of the information regarding the position of the marker (wave line cross mark H') transformed from the real space coordinates into the display coordinates, the projection matrix P may be corrected on the basis of the second eyeball image 64. In addition, the method of controlling display of an AR image or the like is not limited.

The correction routine is appropriately repeated until the position of the subtitle N in the second eyeball image 64 is converged to a predetermined range.

As described above, the image generation unit generates an AR image corresponding the real space, and the correction unit corrects image display including correction of the projection matrix P and the like on the basis of the positional relationship between the one or more reference elements H included in the first eyeball image 60 and the AR image included in the second eyeball image 64. Accordingly, it is possible to control display of an AR image or the like by the transmissive display 13.

By performing calibration using an AR image instead of a marker image, it is possible to shorten the processing time and improve the processing speed. Further, it is also possible to execute calibration without interrupting the user's AR experience.

One or more markers may be display together with the subtitle N when displaying the subtitle N on the transmissive display 13. Then, calibration may be executed on the basis of the positional relationship between the marker and subtitle N included in the second eyeball image and the reference elements H. That is, calibration by a marker image and calibration by an AR image may be combined with each other. Accordingly, it is possible to correct the projection matrix P and the like with high accuracy. Note that an image including a marker and an AR image can be regarded as a marker image including a marker.

Further, the transmittance is not necessarily restrained when imaging the second eyeball image 64 shown in FIG. 8C. In this case, in the second eyeball image, the subtitle N displayed on the transmissive display 13 and the screen in the real space are superimposed and displayed. By executing calibration on the basis of the positional relationship thereof, it is possible to control image display with high accuracy.

In the case where calibration is executed on the basis of the second eyeball image in which the subtitle N displayed on the transmissive display 13 and the screen in the real space are displayed, it is also possible to execute calibration without using the first eyeball image 60. In this case, for example, the subtitle N is displayed at an appropriate position, the second eyeball image is captured, and calibration is executed.

Other Embodiments

The present technology is not limited to the above-mentioned embodiments, and other various embodiments can be realized.

In the first embodiment, as shown in FIG. 4, movement amount correction has been executed on the reference element F3. However, the present technology is not limited thereto. For example, the movement amount correction may be executed on an image related to the real space such as the marker image 52 or the like displayed on the transmissive display 13. Also in this case, it is possible to correct the deviation of the field of view due to the behavior of the user or the like, which occurs during imaging of the first eyeball image 50 and imaging of the second eyeball image 53. As a result, it is possible to control display of an AR image or the like with high accuracy.

In the flowchart shown in FIG. 3, the transmittance of the light control device 14 has been adjusted in Step 108 to capture the second eyeball image 53. However, the second eyeball image may be captured without adjusting the transmittance of the light control device 14, i.e., without reducing the transmittance. Accordingly, since the time difference between capturing of the first eyeball image and capturing of the second eyeball image can be shorten, it is possible to suppress the error of calibration due to the behavior of the user during that time. Further, it is possible to shorten the processing time and improve the processing speed, which reduce the burden on the user.

In FIG. 6, in order to improve the accuracy of extracting the marker M2, the shape and the like of the marker M2 have been adjusted. However, the present technology is not limited thereto, and the shape and the like of the marker M2 may be adjusted on the basis of how the one or more markers in the second eyeball image are reflected. For example, in the case where the marker appears bad in the second eyeball image and the extraction accuracy is low, it is possible to improve the correction accuracy by reducing the display density, increasing the luminance, or changing the color or the like, instead of displaying each marker large. On the contrary, in the case where the accuracy of extracting the marker is sufficiently high, it is possible to execute calibration with sufficiently high accuracy, by reducing the size of each marker and increasing the display density. As described above, it is possible to correct display of an AR image or the like with high accuracy by adjusting display on the basis of how the one or more markers are reflected.

In FIG. 5, a depth map for the real object (rectangular parallelepiped 51) appearing in the user's field of view has been generated on the basis of the output of the vision sensor 15. The method of generating real space information regarding the position, shape, and the like of the real object is not limited, and another method may be used. For example, it is possible to acquire information regarding the surrounding environment of the user from a network system via the communication unit 21. From this, information (real space information) regarding the real object in the user's field of view can be generated. Here, in order to identify the surrounding environment of the user, the information regarding the user's state including the line-of-sight direction 17 and current position of the user is used. Further, the self-location estimation of the user and the surrounding map creation by the SLAM technology may be used.

For example, in the case where the user is outdoors, information regarding the height of the building, the width of the building, the distance to the building, and the like is generated as information of the real object. Further, in the case where the user is indoors, information regarding the size of the movie theater screen, the size of the white board, and the like is generated. Accordingly, it is possible to correct image display on the basis of detailed information of the real object, and control display of an AR image by the transmissive display 13 with high accuracy.

For example, in the case where the real space coordinates of vertices of the screen 61 of the real space in the second embodiment are used, the information can be acquired without using the vision sensor 15. Specifically, on the basis of the position (seat) of the user, information (including coordinates of the vertices) regarding the shape, size, and the like of the screen viewed from the seat may be acquired via the communication unit or the like. Alternatively, information regarding the seat and information regarding the screen may be associated with each other and stored in advance. Note that when displaying the subtitle N on the transmissive display 13, the information regarding the screen corresponding to the seat or the like may be used.

The place where real space information is provided is not limited to movie theaters and the like. For example, real space information regarding the real object such as a window frame and a table viewed from the position (seat) of the user at a place such as an airplane cabin and a train car may be provided. Accordingly, it is possible to realize various types of AR experience.

In order to realize an AR environment, a virtual object (AR image) is displayed on the transmissive display. At this time, a marker for calibration may be displayed together therewith. Alternatively, a part of the AR image displayed on the transmissive display 13 may be used for calibration. Accordingly, the user is capable of correcting display of the AR image while using the HMD 100. Accordingly, it is possible to reduce the burden on the user, and improve the feeling of use of the HMD 100.

The marker image displayed on the transmissive display is not limited to a still image, and an animation image (moving image) expressing the movement of the marker may be displayed. The moving image or a plurality of consecutive still images obtained by capturing an image of the eyeball on which the animation image is reflected is acquired as the second eyeball image (group). Accordingly, the detection efficiency of the marker (reference element) appearing on the second eyeball image (group) is improved, and it is possible to correct display of an AR image or the like with high accuracy.

Figure 9:
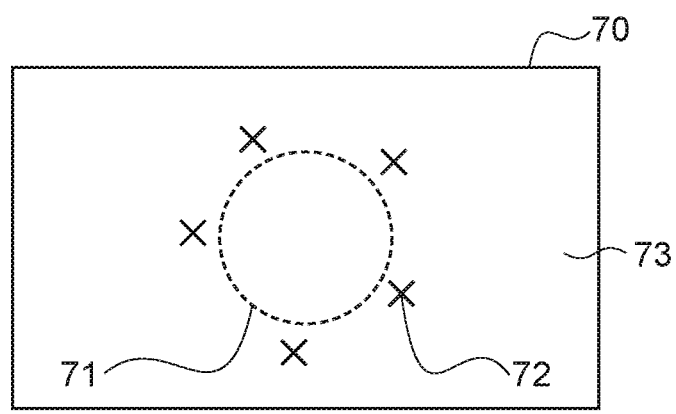
FIG. 9 is a schematic diagram showing an example of a marker image according to another embodiment.

FIG. 9 is a schematic diagram showing an example of a marker image according to another embodiment. When generating a marker image 70, an area where a marker 72 is displayed may be appropriately set. For example, a display allowance area in which the marker 72 is allowed to be displayed and a display disallowance area in which the marker is not allowed to be displayed may be set.

In the example shown in FIG. 9, a gaze area 71 in the transmissive display 13 that the eyeball gazes is calculated. The gaze area 71 is set as the display disallowance area, and a peripheral area 73 outside the gaze area 71 is set as the display allowance area. One or more markers 72 corresponding to the one or more reference elements are displayed so as to be inconspicuous in the peripheral area 73 while avoiding the gaze area 71. Accordingly, it is possible to avoid displaying the marker 72 overlapping the gaze target of the user, and realize marker display without disturbing the user's operation. Accordingly, it is possible to reduce the burden on the user, and improve the feeling of use of the HMD 100.

As the calculation of the gaze area 71, for example, the line-of-sight direction 17 of the eyeballs 10 is detected on the basis of the output of the inward facing camera 16. It is possible to calculate the gaze area on the basis of this line-of-sight direction 17. In addition, the method of calculating the gaze area is not limited, and the gaze area may be calculated on the basis of at least one of the first and second eyeball images, for example.

The method of setting the display allowance area and the display disallowance area is not limited, and an arbitrary area may be set. For example, the above-mentioned gaze area 71 may be set as the display allowance area, and the peripheral area 73 may be set as the display disallowance area. Accordingly, it is possible to execute, for example, correction of the display position in the area that the user gazes, with high accuracy.

In the present technology, it is possible to detect the deviation of an AR image or the like in the user's field of view on the basis of the output of the inward facing camera. The HMD is capable of determining whether or not calibration is necessary on the basis of the detection result. Accordingly, it is possible to automatically correct the transformation operation. The condition and method of executing the automatic correction are not limited. For example, whether or not the transformation operation needs to be corrected may be determined, and correction of the transformation operation may be automatically executed in the case where it is determined that the transformation operation is necessary. Accordingly, in the case where the deviation of an AR image or the like occurs, it is possible to automatically correct the deviation, and exhibit a high operability.

For example, it is also possible to continuously observe the deviation of the AR image by displaying a marker having an inconspicuous shape in the peripheral visual field of the user while the HMD is being used. In the case where the deviation of the AR image exceeds a certain standard, the correction routine is automatically executed. Accordingly, it is possible to naturally execute calibration while using the HMD, exhibit a high operability, and improve the feeling of use.

As a condition for executing automatic correction, the determination result related to the timing to execute correction by the determination unit 263 shown in FIG. 2 may be used. That is, the automatic correction may be executed on the basis of the conditions such as the number and distribution of reference elements included in the user's field of view, the change information, and the information regarding the user's state. Processing of executing the automatic correction in the case where the deviation of the AR image exceeds a certain standard and the determination result by the determination unit 263 satisfies a predetermined condition is also possible. Alternatively, when reducing the amount of light to be transmitted by control of the light control device 14 in order to improve the visibility of the AR image, calibration of image display may be executed together therewith. In other words, under the condition that the transmittance of the light control device 14 is reduced on the basis of the intensity of external light, calibration of image display may be executed. As described above, in the case where the user recognizes that the light control device 14 is controlled in order to improve the visibility of the AR image, the control of the transmittance of the light control device 14 based on the intensity of external light can be regarded as control that is unlikely to give discomfort to the user. Therefore, according to the control, it is possible to calibrate image display while suppressing the discomfort to the user with respect to the control of the transmittance of the light control device 14.

Further, the user may select a mode for prohibiting the automatic correction. The user selects whether or not to prohibit the automatic correction via the operation button 20 or the like. For example, by prohibiting the automatic correction during operations such as car driving and machine operation, the user can concentrate on the operation. Further, calibration corresponding to the user's state may be executed. For example, in the case where the user is travelling, calibration may be executed taking into account the periodic movement of the human body. Alternatively, in the case where there is no need to reduce the amount of light to be transmitted by control of the light control device 14 in order to improve the visibility of the AR image, that is, the intensity of external light does not satisfy the condition for controlling the light control device 14, calibration of image display may be prohibited. In the case where the amount of light to be transmitted is reduced by controlling the light control device 14 when the intensity of external light is relatively small, the user is likely to feel discomfort. Therefore, by prohibiting calibration based on the intensity of external light, it is possible to suppress the discomfort to the user.

In the above, as the control of display of an AR image or the like by the transmissive display 13, correction of the deviation related to the display coordinates such as the position, the angle, the size, and the shape has been described. However, the present technology is not limited to this, and information regarding the color, such as the color, luminance, intensity, and saturation of an AR image or the like may be controlled. For example, in the case where brightness due to illumination light is remarkable as in the exhibition of an art museum, it is possible to display an AR image or the like corresponding to the distribution of brightness in the viewing area of the user. That is, by displaying an AR image (e.g., character information) with high luminance in a bright area and an AR image with low luminance in a dark area, it is possible to display an AR image that is easy to recognize for the user. By controlling display of an AR image or the like with high accuracy as described above, it is possible to provide an AR environment with high quality.

In the above, the HMD has been described as an example of the information processing apparatus according to an embodiment of the present technology. However, the present technology is applicable to the case where another arbitrary computer is used.

Further, in the above, the case where the computer (HMD) operated by the user executes the information processing method according to the present technology has been described. However, the information processing method and the program according to the present technology may be executed by another computer capable of communicating with the computer operated by the user via a network or the like. Further, the image display system according to the present technology may be established by the cooperation of the computer operated by the user and another computer.

That is, the information processing method and the program according to the present technology can be executed not only in a computer system including a single computer but also in a computer system in which a plurality of computers operate in cooperation. Not that in the present disclosure, the system refers to a set of a plurality of components (apparatuses, modules (parts), and the like). Whether all the components are in the same casing or not is not considered. Therefore, both of a plurality of apparatuses stored in separate casings and connected via a network and one apparatus having a plurality of modules stored in one casing are systems.

The execution of the information processing method and the program according to the present technology by the computer system includes, for example, a case where acquisition of the first and second images, correction of the transformation operation, and the like are executed by a single computer, and a case where each process is executed by different computers. Further, the execution of each process by a predetermined computer includes causing another computer to execute a part or all of the process and acquiring the result.

That is, the information processing method and the program according to the present technology are applicable also to the configuration of cloud computing in which one function is shared by a plurality of apparatuses via a network and processed in cooperation with each other.

At least two features of the above-mentioned features according to the present technology may be combined. Specifically, various features described in each embodiment may be arbitrarily combined without distinguishing the embodiments with each other. Further, the various effects described above are merely examples and are not limited, and additional effects may be exerted.

It should be noted that the present technology may also take the following configurations.

(1) An information processing apparatus, including:
an acquisition unit capable of acquiring a first image obtained by capturing an image of a real space reflected on a user's eyeball, and a second image obtained by capturing an image related to the real space displayed on a predetermined display unit, the real space displayed on the predetermined display unit being reflected on the eyeball; and
a display control unit that controls, on a basis of the acquired first image and the acquired second image, image display performed by the predetermined display unit.

(2) The information processing apparatus according to (1), in which
the acquisition unit acquires real space information regarding the real space included in a field of view of the user, and
the display control unit displays, on a basis of the real space information, the image related to the real space on the predetermined display unit.

(3) The information processing apparatus according to (2), in which
the display control unit includes an image generation unit that acquires location information of one or more reference elements included in the real space and generates the image related to the real space with reference to positions of the one or more reference elements.

(4) The information processing apparatus according to (3), in which
the image generation unit generates the image related to the real space by a transformation operation of transforming real space coordinates included in the real space information into display coordinates in the predetermined display unit, and
the display control unit includes a correction unit that corrects the transformation operation on a basis of a positional relationship between the one or more reference elements included in the first image and the image related to the real space included in the second image.

(5) The information processing apparatus according to (4), in which
the image generation unit generates an image including one or more markers respectively corresponding to the one or more reference elements, and
the correction unit corrects the transformation operation on a basis of a positional relationship between the one or more reference element included in the first image and the one or more markers included in the second image.

(6) The information processing apparatus according to (5), in which
the image generation unit is capable of adjusting at least one of a shape, size, display density, display color, and luminance of the marker.

(7) The information processing apparatus according to (4), in which the image generation unit generates an AR image corresponding to the real space, and the correction unit corrects the transformation operation on a basis of a positional relationship between the one or more reference elements included in the first image and the AR image included in the second image.

(8) The information processing apparatus according to any one of (4) to (7), in which the correction unit corrects projective transformation from the real space coordinates into the display coordinates.

(9) The information processing apparatus according to any one of (1) to (8), in which the predetermined display unit is a transmissive display disposed to face the eyeball.

(10) The information processing apparatus according to (9), in which the display control unit includes a light control unit capable of adjusting an amount of light to be transmitted through the transmissive display.

(11) The information processing apparatus according to (10), in which the light control unit regulates, when capturing the second imaging, the amount of light to be transmitted.

(12) The information processing apparatus according to any one of (3) to (11), in which the display control unit corrects the location information of the one or more reference elements or the image related to the real space on a basis of a detection result by a sensor unit capable of detecting a state of the user.

(13) The information processing apparatus according to any one of (4) to (12), in which the display control unit includes a determination unit that determines whether or not to correct the transformation operation, and the image generation unit and the correction unit operate on a basis of a result by the determination unit.

(14) The information processing apparatus according to (13), in which the determination unit determines whether or not to execute the correction of the transformation operation on a basis of the number and distribution of the one or more reference elements included in the real space.

(15) The information processing apparatus according to (13) or (14), in which the determination unit determines whether or not to execute the correction of the transformation operation on a basis of at least one of information regarding a state of the user including a line-of-sight direction and position of the eyeball and change information including a change in the positions of the one or more reference elements.

(16) The information processing apparatus according to any one of (5) to (15), in which the display control unit displays the one or more markers respectively corresponding to the one or more reference elements while avoiding a gaze area in the predetermined display unit that the eyeball gazes.

(17) The information processing apparatus according to any one of (4) to (16), in which the display control unit determines whether or not the correction of the transformation operation is necessary, and automatically executes, in a case where it is determined that the correction of the transformation operation is necessary, the correction of the transformation operation.

(18) The information processing apparatus according to any one of (1) to (17), in which the display control unit corrects distortion derived from a surface shape of the eyeball in the first image and the second image.

REFERENCE SIGNS LIST

F2, H reference element
F3 reference element
G2 reference element
10 eyeball
13 transmissive display
14 light control device
15 vision sensor
16 inward facing camera
23 sensor unit
24 controller
55 acquisition unit
26 display control unit
50, 60 first eyeball image
53, 64 second eyeball image
72, M2 marker
62 AR image
100 HMD
260 image generation unit
261 correction unit
262 light control unit
263 determination unit

The invention claimed is:

1. An information processing apparatus, comprising:
an image sensor configured to capture an image of an eyeball of a user; and
circuitry configured to:
  acquire a first image and a second image, wherein
    the first image is of a real space reflected on the eyeball of the user,
    the second image is related to the real space displayed on a display unit, and
    the real space displayed on the display unit is reflected on the eyeball;
  acquire location information of at least one reference element included in the real space;
  generate a third image including at least one marker respectively corresponding to the at least one reference element by a transformation operation, wherein the transformation operation is an operation to transform real space coordinates of the second image included in real space information into display coordinates of the display unit;
  correct the transformation operation based on a positional relationship between the at least one reference element included in the first image and the at least one marker included in the third image; and
  control display of the at least one marker respectively corresponding to the at least one reference element while avoiding a gaze area in the display unit that the eyeball gazes.

2. The information processing apparatus according to claim 1, wherein the circuitry is further configured to:
  acquire the real space information based on the real space included in a field of view of the user; and
  control display, based on the real space information, of the second image related to the real space on the display unit.

3. The information processing apparatus according to claim 2, wherein the circuitry is further configured to generate the second image related to the real space with reference to a position of the at least one reference element.

4. The information processing apparatus according to claim 3, wherein the circuitry is further configured to
generate the second image related to the real space by the transformation operation; and
correct the transformation operation based on a positional relationship between the at least one reference element included in the first image and the second image related to the real space.

5. The information processing apparatus according to claim 3, wherein the circuitry is further configured to correct the location information of the at least one reference element or the second image related to the real space based on a detection of a state of the user.

6. The information processing apparatus according to claim 4, wherein the circuitry is further configured to:
generate an AR image corresponding to the real space; and
correct the transformation operation based on a positional relationship between the at least one reference element included in the first image and the generated AR image.

7. The information processing apparatus according to claim 4, wherein the circuitry is further configured to correct projective transformation from the real space coordinates into the display coordinates.

8. The information processing apparatus according to claim 1, wherein the circuitry is further configured to adjust at least one of a shape, size, display density, display color, or luminance of the at least one marker.

9. The information processing apparatus according to claim 1, wherein the display unit is a transmissive display disposed to face the eyeball.

10. The information processing apparatus according to claim 9, wherein the circuitry is further configured to adjust an amount of light to be transmitted through the transmissive display.

11. The information processing apparatus according to claim 10, wherein the circuitry is further configured to regulate, in a case of capture of the second image, a transmission of the amount of light.

12. The information processing apparatus according to claim 1, wherein the circuitry is further configured to correct distortion derived from a surface shape of the eyeball in the first image and the second image.

13. An information processing method, comprising:
capturing an image of an eyeball of a user;
acquiring a first image and a second image, wherein
the first image is of a real space reflected on the eyeball of the user,
the second image is related to the real space displayed on a display unit, and
the real space displayed on the display unit is reflected on the eyeball;
acquiring location information of at least one reference element included in the real space;
generating a third image including at least one marker respectively corresponding to the at least one reference element by a transformation operation, wherein the transformation operation is an operation of transforming real space coordinates of the second image included in real space information into display coordinates of the display unit; and
correcting the transformation operation based on a positional relationship between the at least one reference element included in the first image and the at least one marker included in the third image; and
controlling display of the at least one marker respectively corresponding to the at least one reference element while avoiding a gaze area in the display unit that the eyeball gazes.

14. A non-transitory computer-readable medium having stored thereon, computer-executable instructions which, when executed by a computer, cause the computer to execute operations, the operations comprising:
capturing an image of an eyeball of a user;
acquiring a first image and a second image, wherein
the first image is of a real space reflected on the eyeball of the user,
the second image is related to the real space displayed on a display unit, and
the real space displayed on the display unit is reflected on the eyeball;
acquiring location information of at least one reference element included in the real space;
generating a third image including at least one marker respectively corresponding to the at least one reference element by a transformation operation, wherein the transformation operation is an operation of transforming real space coordinates of the second image included in real space information into display coordinates of the display unit; and
correcting the transformation operation based on a positional relationship between the at least one reference element included in the first image and the at least one marker included in the third image; and
controlling display of the at least one marker respectively corresponding to the at least one reference element while avoiding a gaze area in the display unit that the eyeball gazes.

15. An information processing apparatus, comprising:
circuitry configured to:
acquire a first image and a second image, wherein,
the first image is of a real space reflected on an eyeball of a user,
the second image is an image related to the real space displayed on a display unit, and
the real space displayed on the display unit is reflected on the eyeball;
acquire real space information regarding the real space included in a field of view of the user;
acquire location information of one of a plurality of reference elements included in the real space, and
generate an image including one of a plurality of markers respectively corresponding to the one of the plurality of reference elements;
generate the image related to the real space with reference to positions of the one of the plurality of reference elements by a transformation process for transforming real space coordinates included in the real space information into display coordinates of the display unit;
control, based on the acquired first image and the acquired second image, the display of the image related to the real space on the display unit; and
control display of the one of the plurality of markers respectively corresponding to the one of the plurality of reference elements while avoiding a gaze area in the display unit that the eyeball gazes.

* * * * *